Patented Aug. 11, 1953

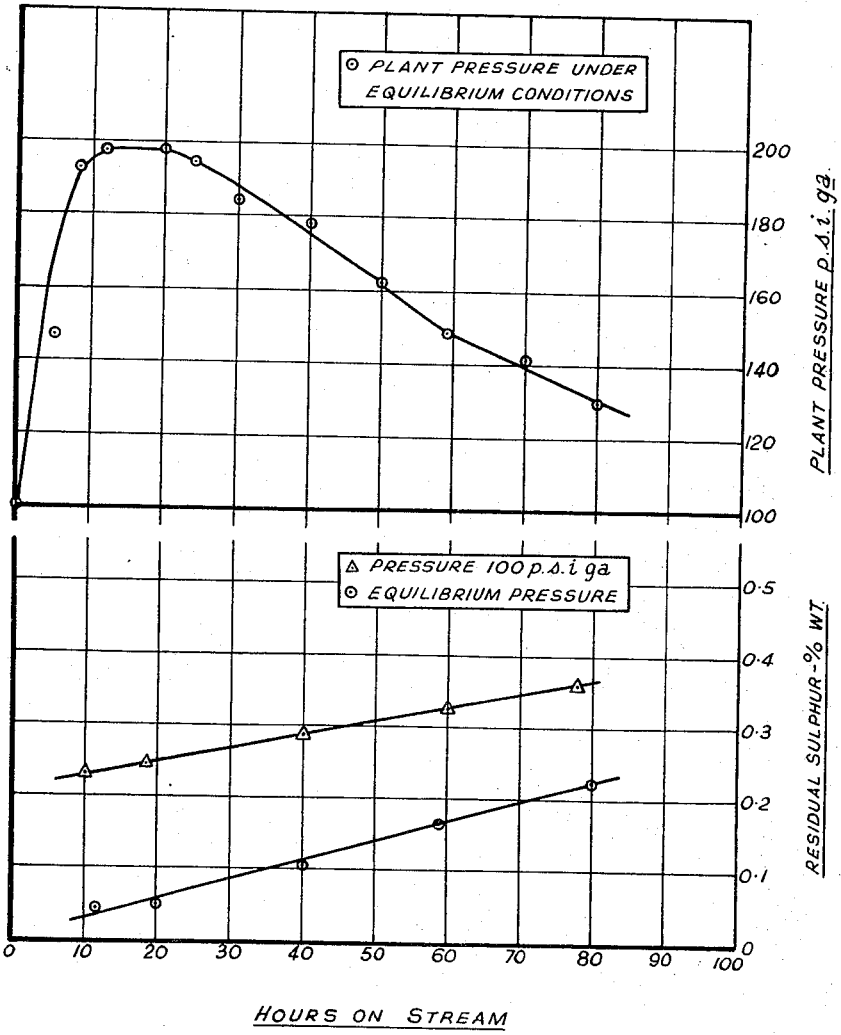

2,648,623

UNITED STATES PATENT OFFICE 2,648,623

CATALYTIC DESULFURIZATION OF PETROLEUM HYDROCARBONS

Frederick William Bertram Porter and Roy Purdy Northcott, Sunbury-on-Thames, England, assignors to Anglo-Iranian Oil Company Limited, London, England, a British joint-stock corporation Application April 1, 1950, Serial No. 153,339
In Great Britain April 8, 1949

4 Claims. (Cl. 196—28)

This invention relates to the catalytic desulphurisation of petroleum hydrocarbons.

In the specifications of the co-pending applications Nos. 35,976, now Patent No. 2,573,726, 46,502, now Patent No. 2,574,445, 68,416, now Patent No. 2,574,446, 100,538, now Patent No. 2,574,448, and 94,262, now Patent No. 2,574,447, there are described processes for the catalytic desulphurisation of petroleum fractions ranging from light distillates, such as light naphtha, to heavy distillates, such as wax distillates, wherein the feedstock is passed to a catalytic desulphurisation zone wherein it is treated in the presence of a sulphur-resistant hydrogenation catalyst, as specified, under conditions of temperature and pressure such that sufficient hydrogen is produced by dehydrogenation of naphthene hydrocarbons contained in the feedstock to effect conversion of sulphur compounds contained in the feedstock into hydrogen sulphide and to provide a hydrogen-rich gaseous fraction which is recycled to the catalytic desulphurisation zone in order to maintain the necessary partial pressure of hydrogen therein. It will thus be appreciated that such processes are carried out without the necessity of using extraneous hydrogen and it is convenient to designate such processes as autofining processes to distinguish them from similar catalytic desulphurisation processes carried out with the aid of extraneous hydrogen, the latter processes being commonly called hydrofining processes.

The autofining process has hitherto been operated by setting the pressure in the autofining zone at a predetermined level and thereafter withdrawing from the system gas in excess of that required to maintain the predetermined pressure. There was thus a continuous make of hydrogen indicating that the hydrogen produced in the dehydrogenation reaction was not being fully utilised in the desulphurisation reaction. An improved method of operating the autofining process has now been discovered which enables a greater degree of desulphurisation to be achieved, the on-stream hours for a product of a given sulphur content to be increased, and the hydrogen produced in the dehydrogenation reaction to be fully utilised in the desulphurisation reaction.

According to the invention, a hydrocatalytic process for the desulphurisation of a naphthene- and sulphur-containing petroleum feedstock, comprises passing said feedstock to an autofining zone wherein it is contacted with an autofining catalyst under such conditions of temperature and pressure as to produce sufficient hydrogen by dehydrogenation of naphthene hydrocarbons contained in the feedstock to supply the hydrogen requirements in the reaction zone, whereby organically combined sulphur contained in the feedstock is converted into hydrogen sulphide, separating hydrogen sulphide and a hydrogen-containing gaseous fraction from the products from the autofining zone, recycling said hydrogen-containing gaseous fraction to said zone, and allowing the pressure therein to rise to an equilibrium pressure at which the hydrogen evolved equals the hydrogen consumed.

By an autofining catalyst is meant a catalyst which is effective both for the dehydrogenation of naphthenes and the hydrogenation of organic sulphur compounds. The preferred catalyst is of the so-called cobalt molybdate type which consists of the oxides of cobalt and molybdenum deposited on or incorporated with a support, preferably alumina.

With this method of operation, since it is convenient to recycle the gas at a constant rate by volume under plant pressure, and in view of the fact that the plant pressure is varying, the volume of gas recycled to the autofining zone at standard conditions of temperature and pressure will therefore also vary.

The advantages to be derived from the present method of operation are clearly brought out in the accompanying drawing and in the following results obtained when autofining an Iraqi gas oil containing 0.89% wt. of sulphur.

A run of 80 hours duration was carried out under the conditions set out in the following table which also sets out the results obtained.

| Test Period No. | Feedstock | 1 | 2 | 3 | 4 | 5 | Bulked Product |
|---|---|---|---|---|---|---|---|
| Hours on stream since regeneration | | 12 | 20 | 40 | 59 | 80 | |
| Operating Conditions: | | | | | | | |
| Catalyst | Cobalt molybdate on alumina. | | | | | | |
| Catalyst charge Vol., ml | 1,000 | | | | | | |
| Catalyst charge Wt., g | 837 | | | | | | |
| No. of regenerations | 11 | | | | | | |
| Total life of catalyst, hr | | 453 | 461 | 481 | 500 | 521 | |
| Direction of Flow | Downward | | | | | | |
| Av. catalyst bed temp., °F | | 788 | 786 | 784 | 785 | 786 | |
| Reactor pressure, p. s. i. ga. | | 198 | 198 | 178 | 148 | 131 | |
| Space Velocity, v/v/hr | | 1.94 | 1.97 | 1.88 | 2.08 | 2.06 | |
| Recycle gas rate, C. F. B | | 4,030 | 3,980 | 3,760 | 2,880 | 2,600 | |
| Recycle gas rate at plant pressure, C. F. B. | | 300 | 294 | 310 | 286 | 292 | |
| Recycle gas density (air=1) | | 0.30 | 0.21 | | | | |
| Recycle gas Mol. Percent H² (±1%) | | 76 | 86 | | | | |
| Gas Make, C. F. B | | 23.8 | 8.8 | Nil | Nil | Nil | |
| Liquid Product: | | | | | | | |
| Percent Wt. on feedstock | 100.0 | | 98.7 | 98.0 | 99.7 | 98.6 | |
| Specific Gravity, 60°/60° F | 0.8365 | 0.8265 | 0.8270 | 0.8280 | 0.8285 | 0.8300 | 0.8290 |
| Gravity, °A. P. I. | 37.7 | 39.7 | 39.6 | 39.4 | 39.3 | 39.9 | 39.2 |
| Distillation: | | | | | | | |
| I. B. P., °F | 427 | | 207 | | 253 | | 223 |
| 5% Vol. @ °F | 460 | | 416 | | 428 | | 427 |
| 10% Vol. @ °F | 470 | | 437 | | 451 | | 450 |
| 20% Vol. @ °F | 487 | | 462 | | 475 | | 473 |
| 50% Vol. @ °F | 533 | | 518 | | 523 | | 527 |
| 90% Vol. @ °F | 632 | | 614 | | 619 | | 618 |
| F. B. P., Vol. @ °F | 700 | | 694 | | 694 | | 690 |
| Total distillate, percent Vol | 98.5 | | 99 | | 99 | | 99 |
| Residue+Loss, Percent Vol | 1.5 | | 1 | | 1 | | 1 |
| Corrosion (Cu Strip) | Pass | | | Pass | Pass | | Pass |
| Sulphur, Percent Wt | 0.89 | 0.042 | 0.047 | 0.106 | 0.173 | 0.236 | 0.130 |
| Sulphur Removal, Percent | | 95.0 | 94.5 | 88.0 | 80.5 | 73.5 | 85.5 |

The run was started with the plant at a pressure of 100 p. s. i. ga. and the pressure then allowed to find its own level except that it was not allowed to rise above 200 p. s. i. ga. in view of some uncertainty as to the maximum safe working-pressure of the gas recycle booster. It is considered that the plant would have reached a maximum pressure of 225 p. s. i. ga. under true equilibrium conditions. During the run, the volume of recycle gases measured at plant pressure was kept constant, i. e. the booster was run at constant displacement and the recycle rate measured in SCF/B directly proportional to the plant pressure. The pressure rose to 200 p. s. i. ga. at 8 hours on stream (Figure 1) and excess gas was made until 25 hours on stream, after which the pressure fell steadily, reaching a value of 131 p. s. i. ga. when the run was terminated at 80 hours on stream. The average sulphur removal over 80 hours on stream was 85.5% (0.89% wt. sulphur content to 0.13% wt.). A run of the same duration on the same feedstock at a constant pressure of 100 p. s. i. ga. resulted in a sulphur removal of 67% (0.89% wt. sulphur content to 0.292% wt.). The improved desulphurisation obtained by operating according to the present invention is illustrated graphically in Figure 2. It is evident that running under equilibrium pressure conditions, as compared with running at a constant pressure of 100 p. s. i. ga., resulted in very much longer on-stream hours for the same sulphur removal.

The process of the invention is applicable to any feedstock that is capable of being autofined and is of particular advantage as applied to feedstocks that are comparatively high in sulphur, such as gas oils and kerosene extracts.

We claim:

1. In a continuous process for the hydrocatalytic desulphurization of a sulphur and naphthene-containing hydrocarbon oil wherein the oil is contacted in a reaction zone at an elevated temperature and pressure in the presence of hydrogen with a dehydrogenation-hydrogenation catalyst which is immune to sulphur poisoning and combines activity for the dehydrogenation of naphthenes to aromatics with activity for the hydrogenation of organically combined sulphur in the oil to hydrogen sulphide, the method of operating the process so that it will be self-supporting with respect to the amount of hydrogen needed and produce product oil having, except for lowered sulphur content, properties and boiling range substantially the same as the feedstock, comprising the steps of passing the oil to be treated through said reaction zone and contacting the oil therein with said catalyst and with hydrogen derived solely from the oil, maintaining a selected temperature in said zone between about 650° F. to about 800° F. at which hydrogen is continuously evolved from said oil by dehydrogenation of naphthenes contained in the oil, for consumption in converting organically combined sulphur in the oil to hydrogen sulphide; allowing the pressure in said zone to rise to an equilibrium pressure at which the hydrogen evolved equals the hydrogen consumed, by separating a hydrogen-rich gaseous fraction from the products from the reaction zone, said fraction containing substantially the content of hydrogen as such in said products, and recycling said hydrogen-rich gaseous fraction to said reaction zone, the hydrogen of said fraction constituting the whole of the hydrogen supplied as such to said zone; and, recovering the desired product oil from the residue of said separating operation.

2. A process in accordance with claim 1 in which said catalyst is of the cobalt-molybdate type.

3. A process in accordance with claim 1 in which said hydrogen-rich gaseous fraction separated from the products from the reaction zone has a hydrogen content upwards of about seventy-six mol percent.

4. A process in accordance with claim 1 in which the feedstock is a gas oil, in which the temperature in the reaction zone is about 786° F., and in which the hydrogen-rich gaseous fraction is recycled to the reaction zone at a substantially constant ratio by volume to the feedstock of substantially 300 CF/B at plant pressure of the feedstock.

FREDERICK WILLIAM BERTRAM PORTER.
ROY PURDY NORTHCOTT.

References Cited in the file of this patent

UNITED STATES PATENTS

| Number | Name | Date |
|---|---|---|
| 2,393,288 | Byrns | Jan. 22, 1946 |
| 2,441,297 | Stirton | May 11, 1948 |
| 2,461,069 | Marisic et al. | Feb. 8, 1949 |
| 2,487,466 | Nahin | Nov. 8, 1949 |
| 2,500,146 | Fleck et al. | Mar. 14, 1950 |
| 2,573,726 | Porter et al. | Nov. 6, 1951 |
| 2,574,445 | Porter et al. | Nov. 6, 1951 |
| 2,574,446 | Docksey et al. | Nov. 6, 1951 |
| 2,574,447 | Porter | Nov. 6, 1951 |
| 2,574,448 | Docksey et al. | Nov. 6, 1951 |
| 2,574,450 | Porter et al. | Nov. 6, 1951 |
| 2,574,451 | Porter et al. | Nov. 6, 1951 |